United States Patent
Kobayashi

(10) Patent No.: US 10,795,516 B2
(45) Date of Patent: Oct. 6, 2020

(54) DISPLAY DEVICE

(71) Applicant: Japan Display Inc., Minato-ku (JP)

(72) Inventor: Kanae Kobayashi, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 147 days.

(21) Appl. No.: 16/048,812

(22) Filed: Jul. 30, 2018

(65) Prior Publication Data

US 2019/0042023 A1 Feb. 7, 2019

(30) Foreign Application Priority Data

Aug. 7, 2017 (JP) ................................ 2017-152277

(51) Int. Cl.
| | | |
|---|---|---|
| *G06F 3/044* | (2006.01) | |
| *G06F 3/041* | (2006.01) | |
| *G02F 1/1333* | (2006.01) | |
| *G02F 1/1343* | (2006.01) | |
| *G02F 1/1368* | (2006.01) | |

(52) U.S. Cl.
CPC ............ *G06F 3/044* (2013.01); *G02F 1/1368* (2013.01); *G02F 1/13338* (2013.01); *G02F 1/134309* (2013.01); *G06F 3/0412* (2013.01); *G06F 2203/04112* (2013.01)

(58) Field of Classification Search
CPC .................. G06F 3/044; G06F 3/0412; G06F 2203/04112; G02F 1/13338; G02F 1/134309; G02F 1/1368
See application file for complete search history.

(56) References Cited

U.S. PATENT DOCUMENTS

| | | | | |
|---|---|---|---|---|
| 2014/0320760 | A1* | 10/2014 | Ishizaki .................. | G06F 3/044 349/12 |
| 2015/0277485 | A1* | 10/2015 | Kosugi ................... | G06F 3/044 345/174 |
| 2015/0355752 | A1 | 12/2015 | Kurasawa et al. | |
| 2017/0228052 | A1* | 8/2017 | Nakamura .............. | G06F 3/044 |

FOREIGN PATENT DOCUMENTS

| | | |
|---|---|---|
| JP | 2014-191650 | 10/2014 |
| JP | 2015-232819 | 12/2015 |

* cited by examiner

*Primary Examiner* — Amit Chatly
(74) *Attorney, Agent, or Firm* — Oblon, McClelland, Maier & Neustadt, L.L.P.

(57) ABSTRACT

The purpose is to realize the display device installed with touch panel having less moire. A display device having metal wirings on a display screen comprising: the metal wirings include; first and second metal wirings extending in a first direction and arranged in a second direction, the first metal wiring has a first line, which has a first angle to the first direction, and a second line, which has a second angle to the first direction, the second metal wiring has a third line and fourth line, which are configured as the same manner as the first metal wiring, the first metal wiring and the second metal wiring are arranged so that the first to fourth lines form rectangle, wherein, at a cross point of the first to fourth lines, the first line and the second line are connected and the third line and the fourth line are separated.

5 Claims, 16 Drawing Sheets

DISPLAY DEVICE

CLAIM OF PRIORITY

The present application claims priority from Japanese Patent Application JP 2017-152277 filed on Aug. 7, 2017, the content of which is hereby incorporated by reference into this application.

BACKGROUND OF THE INVENTION

(1) Field of the Invention

The present invention relates to a display device, specifically to a display device that includes a touch panel function.

(2) Description of the Related Art

Recently, display devices that include touch panel function is increasing in the smart phone and the tablet PC. One type of those displays is that a touch panel is formed separately from the display panel; then, the touch panel and the display panel are assembled. Another type is a so called in-cell touch panel where touch panel function is installed in the display panel. If those touch panels are electrostatic capacitance type, both types need Tx (transmitter) electrodes, which are driving electrodes, and Rx (receiver) electrodes, which are detecting electrodes. Conventionally transparent conductive oxide film as ITO (Indium Tin Oxide) has been used for the Rx electrodes to make the electrodes inconspicuous.

The transparent oxide conductive film, however, has a high electric resistance, thus, transmittance speed of signals becomes slow; consequently, there has been a problem of response speed, specifically, in a large sized touch panel. Therefore, metal has been used for the Rx electrodes or other wirings of the touch panel to maintain necessary response speed. However, since the metal is opaque, the wirings must be configured so that they are not visible.

The patent document 1 (Japanese patent laid open 2014-191650) discloses an example that the wirings for the RX electrodes of the touch panel are made zigzag. The patent document 2 (Japanese patent laid open 2015-232819) discloses an example that the wirings for the RX electrodes of the touch panel are made mesh.

SUMMARY OF THE INVENTION

The wirings for the Rx electrodes disclosed in the patent document 1 and the patent document 2 are both typical ones; however, they has their own specific phenomena in appearances.

In the case of zigzag shape, as shown in FIG. 14, the wrings 1 for the Rx electrode extend in x direction, and are arranged in y direction. In the wiring 1, the slanted wirings extend in x direction changing angles repeatedly. Therefore, there appears a phenomenon that the wirings of either one of angles are visible when the light is illuminated form the lower side direction (FIG. 15A) or from the lower right side (FIG. 15B) of the screen. The arrow I in FIG. 15A and the arrow II of FIG. 15B show the direction the light is illuminated from. FIG. 16 is a cross sectional view of the wiring 1 that constitutes the first electrode Rx. The width mw of the wiring 1 is e.g. 4 µm. The wiring 1 is formed by four layers. The low layer R1 (base metal) is e.g. made of Mo, the thickness is e.g. 10 nm. The aluminum alloy layer R2, which the main substance is aluminum, is formed on that in a thickness of e.g. 250 nm. The cap metal R3 is formed on the aluminum alloy layer R2 by e.g. Mo in a thickness of e.g. 30 nm. The reflection preventing layer R4, which is made of e.g. IGO (Indium Gallium, Oxide), is formed on the cap metal R3 in a thickness of e.g. 100 nm. Since the wiring 1 is made relatively thick and the side of the wiring 1 is made forward tapered, it tends to reflect the external light as depicted in FIG. 16. In FIG. 16, IL is external light and RL is reflected light. Since this reflected light RL is visible only from a specific viewing angle, the phenomena depicted in FIG. 15A and FIG. 15B appear. In this case the visible portions of the reflected light RL are observed as streaks extending in y direction, which are called streaks of reflection.

On the other hand, in the case of mesh type Rx electrodes, there appears continuous lines even when the light is illuminated from lower left or from lower right as depicted in FIG. 17A or FIG. 17B. Consequently, as a whole device, longitudinal lines in the screen don't appear, thus, the streaks of reflected light don't appear. In the mesh type Rx electrodes, however, other phenomenon appears.

FIG. 18 is a plan view that shows the wiring 1 of mesh type Rx electrodes and the display device are superposed. The display device, here, is a liquid crystal display panel. In FIG. 18, on the TFT substrate of the liquid crystal display panel, the scan lines 10 extend in the lateral direction and the video signal lines 20 extend in the longitudinal direction; the pixel 30 is formed in an area surrounded by the scan lines 10 and the video signal lines 20. Each area of the meshes formed by wirings 1 is bigger than each area of the pixels 30. As depicted in FIG. 18, some pixels 30 overlap with the wirings 1 while other pixels do not overlap with the wirings 1.

FIG. 19 is an enlarged view that explains this structure. FIG. 19 is a plan view that the wirings 1 and the pixels 30 overlap. The numbers (n, m) in the pixels 30 in FIG. 19 show positions of the pixels. In FIG. 19, the pixel (2, 2) in the center, which overlaps with the cross point of wring 1, has larger area that is covered by the wiring 1, thus, an opening ratio becomes smaller; consequently, brightness of the pixel decreases. Only parts of two wirings 1 overlap with the pixels (2, 1) and (2, 3), which are adjacent to the center pixel (2, 2); thus, the pixels (2, 1) and (2, 3) become brighter than the center pixel (2, 2). The pixels (1, 1) (1, 3) (3, 1) (3, 3) at the four corners overlap with only one wiring 1; thus, those pixels become slightly brighter than the pixels (2, 1) and so on. On the other hand, the upper pixel (1, 2) and the lower pixel (3, 2) in the center do not overlap with the wiring 1, thus those pixels become bright most.

FIG. 20 is a plan view that shows brightness in each of the pixels according to the explanation above. FIG. 20 depicts that the brightness of pixels changes according to how the pixels overlap with the wiring 1. The placement of meshes appear periodically in wirings 1 for the Rx electrodes, the brightness pattern of FIG. 20 appears periodically. FIG. 21 shows an example that such moire appears. In such a case, even when mono color is displayed, areas of notation 60 of different brightness appear periodically, this brightness pattern is conceived as moire as an entirety of the screen. The purpose of the present invention is to suppress both of the streaks of reflectance and the moire; thus, to improve the display quality in the display device installed with the touch panel function.

The present invention overcomes the above explained problem; the concrete structures are as follows.

A display device having metal wirings for the touch panel on a display screen comprising: the metal wirings are configured that a rectangle shaped wiring is formed by four lines; a plurality of the rectangle shaped wirings contiguously extend in a first direction; wherein, at the cross point where the four lines cross, at least two lines are separated from other two wirings.

DETAILED DESCRIPTION OF THE PREFERRED EMBODIMENTS

The present invention will be described in detail referring to the following embodiments. In the embodiments, description is made with a liquid crystal display device as an example.

Embodiment 1

Figure 1:
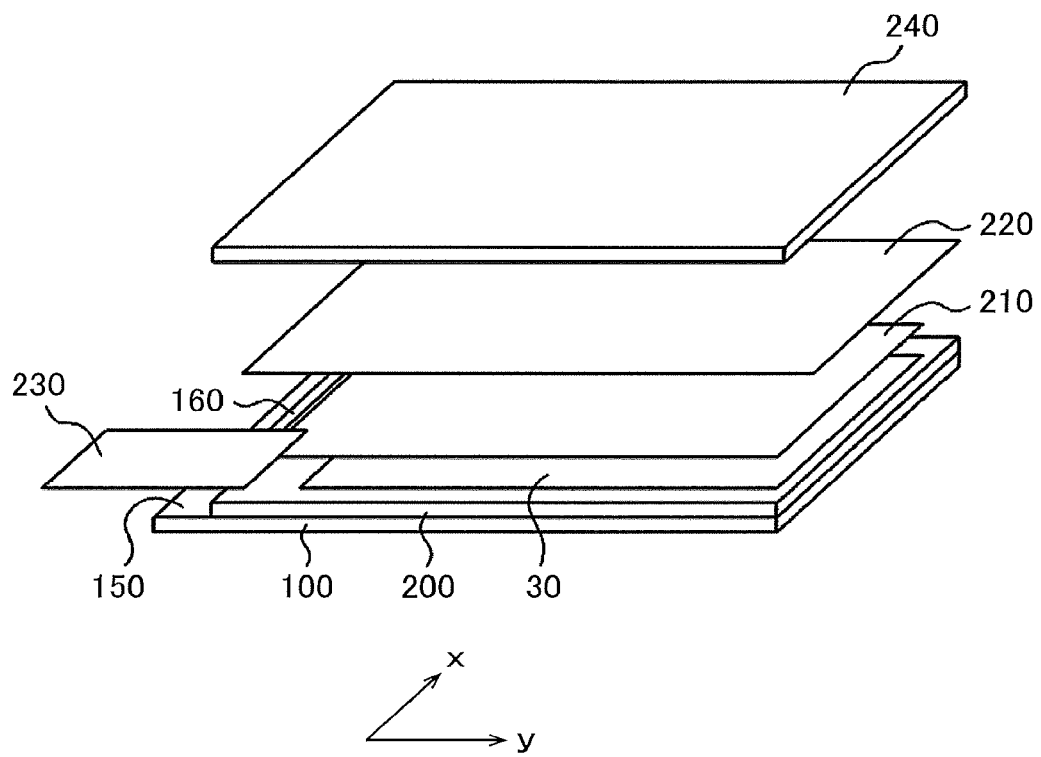
FIG. 1 is an exploded perspective view of the liquid crystal display device.

FIG. 1 is an example of an exploded perspective view of the liquid crystal display device according to the present invention. The liquid crystal display panel for display of FIG. 1 has a function of touch panel. In FIG. 1, the counter substrate 200 is disposed over the TFT substrate 100; Rx electrodes (the first electrodes), which are detecting electrodes for the touch panel, are formed on the outside (display surface side) of the counter substrate 200. The protective film 210 made of transparent organic substance as e.g. acrylic is formed over the first electrodes Rx. The upper polarizing plate 220 is disposed on the protective film 210. The cover glass 240 is disposed over the upper polarizing plate 220. Though they are not shown in FIG. 1, the lower polarizing plated is disposed under the TFT substrate 100; in addition, a back light is set rear the lower polarizing plate.

The flexible wiring film 230 for the touch panel is connected to the edge of the counter substrate 200 to connect with the first electrodes formed outside of the counter substrate 200. In the meantime, the Tx electrodes (second electrodes) for driving the touch panel are formed by patterning the common electrode of the TFT substrate 100 of the liquid crystal display panel to make the liquid crystal display panel of FIG. 1 function as the touch panel. Such structure of touch panel is called in-cell type.

In FIG. 1, the TFT substrate 100 is made bigger than the counter substrate 200; the portion of the TFT substrate 100 that does not overlap with the counter substrate 200 is the terminal area 150; the driver IC 160 is installed in the terminal area 150. Though it is omitted in FIG. 1, a main flexible wiring is connected to the terminal area 150 to supply signals and powers to the liquid crystal display device. In FIG. 1, the lateral direction, namely the orthogonal direction to the side along the terminal area 150, is y axis; the direction parallel to the side along the terminal area 150 is x axis.

Figure 2:
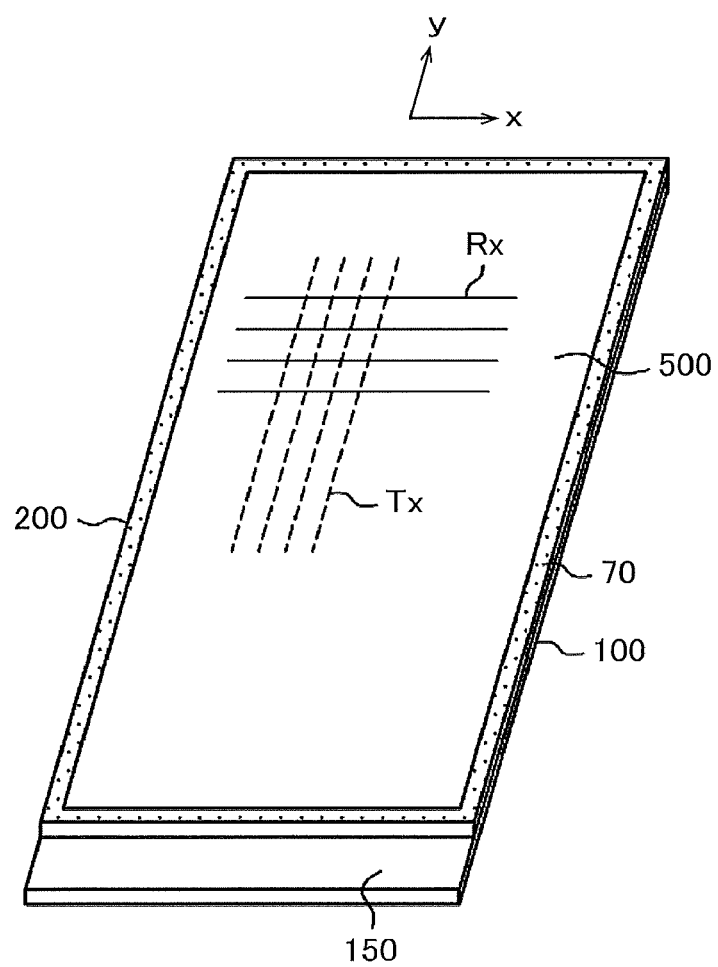
FIG. 2 is a perspective view of the liquid crystal display panel.

FIG. 2 is a perspective view of the liquid crystal display panel constituted by the TFT substrate 100 and the counter substrate 200 of the liquid crystal display device of FIG. 1. In this specification, an assembly of the TFT substrate 100 and the counter substrate 200 is called a liquid crystal display panel; however, it may be called a liquid crystal display device, too. A thickness of the TFT substrate 100 is e.g. 0.15 mm and a thickness of the counter substrate 200 is e.g. 0.15 mm in FIG. 2.

In FIG. 2, the counter substrate 200 is adhered to the TFT substrate 100 through the seal material 70; the liquid crystal is sealed between them. The display area 500 is surrounded by the seal material 70. The first electrodes Rx for touch panel are formed on the outside of the counter substrate 200; the second electrodes Tx for touch panel are formed on inside of the TFT substrate 100 by patterning the common electrode. In FIG. 2, the direction parallel to the side along the terminal area is x axis; the orthogonal direction to the side along the terminal area is y axis, It is the same for other figures.

Figure 3:
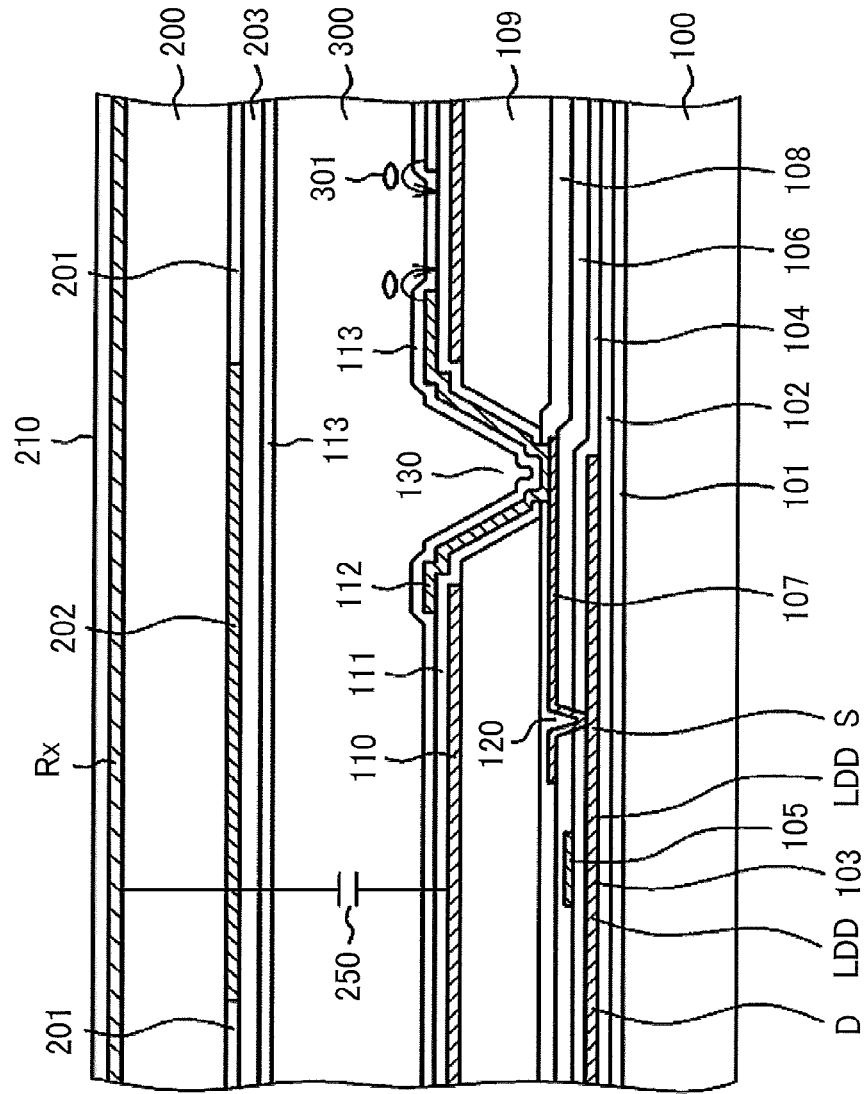
FIG. 3 is a cross sectional view of the IPS type liquid crystal display panel having a touch panel function.

FIG. 3 is a cross sectional view of the display area of the liquid crystal display panel depicted in FIG. 2. FIG. 3 is a cross sectional view of the IPS (In Plane Switching) type liquid crystal display device. The below is an explanation in regard to the IPS type liquid crystal display device as an example, however, the present invention is applicable to other types of liquid crystal display devices like VA, TN and etc.

In FIG. 3, the first undercoat 101 made of silicon nitride (SiN) and the second undercoat 102 made of silicon oxide (SiO) are formed by CVD (Chemical Vapor Deposition) on the glass substrate 100. The SiN layer and the SiO layer may be made in reverse order. The role of the first undercoat 101 and the second undercoat 102 is to prevent the semiconductor layer 103 from being contaminated by impurities in the glass substrate 100.

The semiconductor layer 103 is formed on the second undercoat 102. This semiconductor layer 103 is a polysilicon film formed as that: a-Si film is formed by CVD on the undercoat 102; the a-Si film is transformed to the poly-Si film by laser annealing. This poly-Si film is patterned by photolithography.

The gate insulating film 104 is formed on the semiconductor layer 103. The gate insulating film 104 is SiO film, which is formed by CVD using TEOS (Tetraethoxysilane) as the material. The gate electrode 105 is formed on the gate insulating film 104. The gate electrode 105 is the scan line 10 shown e.g. in FIG. 5. The gate electrode 105 is formed by e.g. MoW (Molybdenum Tungsten) film. If the electrical resistance of the gate electrode 105 or the scan line 10 must be low, Aluminum alloy is used.

The gate electrode 105 is patterned by photo lithography; during this patterning, impurities as e.g. Phosphor or Boron are doped in the poly-Si layer to form the source S or the drain D in the poly-Si layer 103. Further, LDD (Lightly Doped Drain) is formed between the channel layer and the source S or between the channel layer and the drain D utilizing the photo resist for patterning the gate electrode 105.

After that, the first interlayer insulating film 106 is formed by SiO covering the gate electrode 105. The first interlayer insulating film 106 is to insulate between the gate electrode 105 and the contact electrode 107. The through hole 120 is formed through the first interlayer insulating film 106 and the gate insulating film 104 to connect the source S of the semiconductor layer 103 and the contact electrode 107. The through hole 120 in the first interlayer insulating film 106 and in the gate insulating film 104 is made in the same process.

The contact electrode 107 is formed on the first interlayer insulating film 106. The contact electrode 107 connects with the pixel electrode 112 through the through hole 130. The drain D of the TFT connects with the video signal line 20 through the through hole 130 in e.g. FIG. 5 at the place not shown in FIG. 3.

The contact electrode 107 and the video signal line are formed on the same layer and formed simultaneously. The contact electrode 107 and the video signal line 20 (herein after represented by the contact electrode 107 are formed by e.g. AlSi to make the electric resistance low. AlSi, however, has a problem of producing hillocks or diffusing of Al to the adjacent layer; therefore, to prevent this phenomenon, AlSi is sandwiched by a barrier layer and a base layer; both layers are made of MoW.

The inorganic passivation film (insulating film) 108 is formed over the contact electrode 107 to protect whole of the TFTs. The inorganic passivation film 108 is formed by CVD, the same as the first undercoat 101. The organic passivation film 109 is formed over the inorganic passivation film 108. The organic passivation film 109 is formed by photo sensitive acrylic. In addition to acrylic, the organic passivation film can be made of e.g. silicone resin, epoxy resin or poly imide resin. Since the organic passivation film 109 also has a role of flattening film, it is made thick. In general, the thickness of the organic passivation film 109 is 1-4 micron; in the case that the liquid crystal display device has a touch panel function, the thickness of the organic passivation film 109 is 2-4 micron.

The through hole 130 is formed in the inorganic passivation film 108 and the organic passivation film 109 to connect the pixel electrode 112 and the contact electrode 107. The photo sensitive resin is used for the organic passivation film 109. The photo sensitive resin is coated and exposed to light with a mask; the exposed portion is dissolved in the specific developing solution. Namely, the process to form the photo resist can be eliminated by utilizing the photo sensitive resin. After the through hole 130 is formed in the organic passivation film, the organic passivation film 109 is baked at a temperature of about 230 centigrade; then, the organic passivation film 109 is completed.

After that, the ITO (Indium Tin Oxide) is formed by sputtering on the organic passivation film 109 for the common electrode 110. The common electrode 110 is formed continuously in common in a plural pixels, however, the common electrode 110 is eliminated from the through hole 130 and its vicinity. In addition, since the common electrode is used as the second electrode Tx for the touch panel, the common electrode is patterned for that purpose.

After that SiN is formed on the whole area by CVD to form the second interlayer insulating film 111. After that, the through hole is formed in second interlayer insulating film 111 and in the inorganic passivation film 108 in the through hole 130 to connect the contact electrode 107 and the pixel electrode 112.

After that, the ITO is formed by sputtering and is patterned to form the pixel electrode 112. The alignment layer material is coated over the pixel electrode 112 by e.g. flexographic printing or inkjet; subsequently it is baked to form the alignment film 113. The alignment process for the alignment film 113 is made by rubbing method or photo alignment method using polarized UV ray.

When a voltage is applied between the pixel electrode 112 and the common electrode 110, the line of force is generated as depicted in FIG. 3. The electric field rotates the liquid crystal molecules 301 and controls the amount of light that passes the liquid crystal layer 300 in each of the pixels; consequently, the pictures are formed.

In FIG. 3, the counter substrate 200 is disposed over the TFT substrate 100 sandwiching the liquid crystal layer 300. The color filter 201 is formed on inside of the counter substrate 200. Either one of color filters 201 of red, green or blue is formed in each of the pixels; thus, color pictures are formed. The black matrix 202 is formed between the color filters 201 to prevent color contamination or suppress the reflection from e.g. video signal lines. The black matrix 202 also has a role as a light stopping film for the TFT to prevent the generation of photo current.

The overcoat film 203 is formed over the color filter 201 and the black matrix 202. Since the surface of the color filter 201 and the black matrix 202 are rough, the surface is made smooth by the overcoat film 203. The alignment film 113, which determines the initial alignment of the liquid crystal, is formed on the overcoat film 203. The alignment process for the alignment film 113 is conducted by rubbing method or photo alignment method as the same as explained in the alignment film 113 on the TFT substrate 100.

The first electrode Rx is formed on the outside of the counter substrate 200 to make the liquid crystal display panel work as the touch panel. The first electrode Rx formed on the outside of the counter substrate 200 and the second electrode Tx, which also serves as the common electrode 110, formed on the TFT substrate 100 constitute the electro static capacitance 250 as depicted in FIG. 3; touch position is detected by finding the change in electro static capacitance 250.

Since the first electrode Rx in the present embodiment is made of metal, the protective film 210 is formed over the first electrode Rx to avoid corrosion of the metal. The protective film 210 is made of the resin like acrylic or laminated film of the inorganic film of e.g. SiN and the resin.

Figure 4:
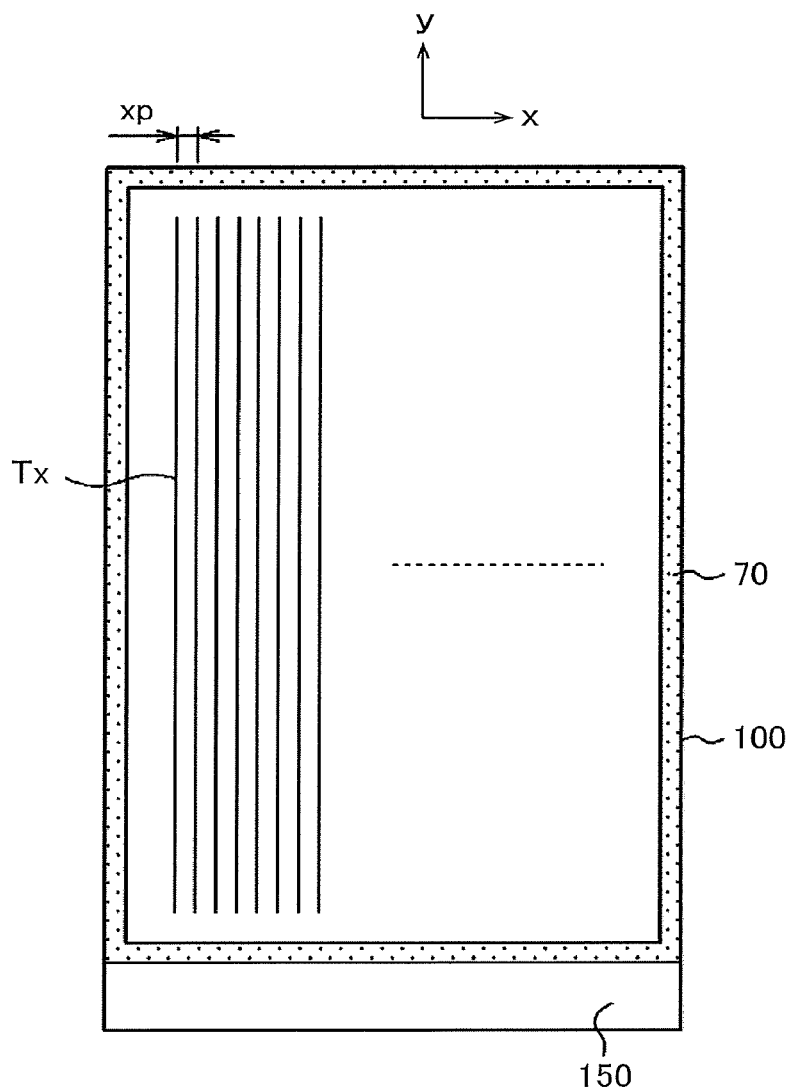
FIG. 4 is a plan view of the second electrode for the touch panel on the TFT substrate.

FIG. 4 is a plan view of the TFT substrate 100. Scan lines and video signal lines are formed on the TFT substrate 100; however, they are omitted in FIG. 4. In FIG. 4, the second electrodes Tx, which are one electrodes for the touch panel, extend in y direction and are arranged in x direction with a pitch of xp. The second electrodes Tx are made by patterning the common electrode 110 formed on the TFT substrate 100.

Figure 5:
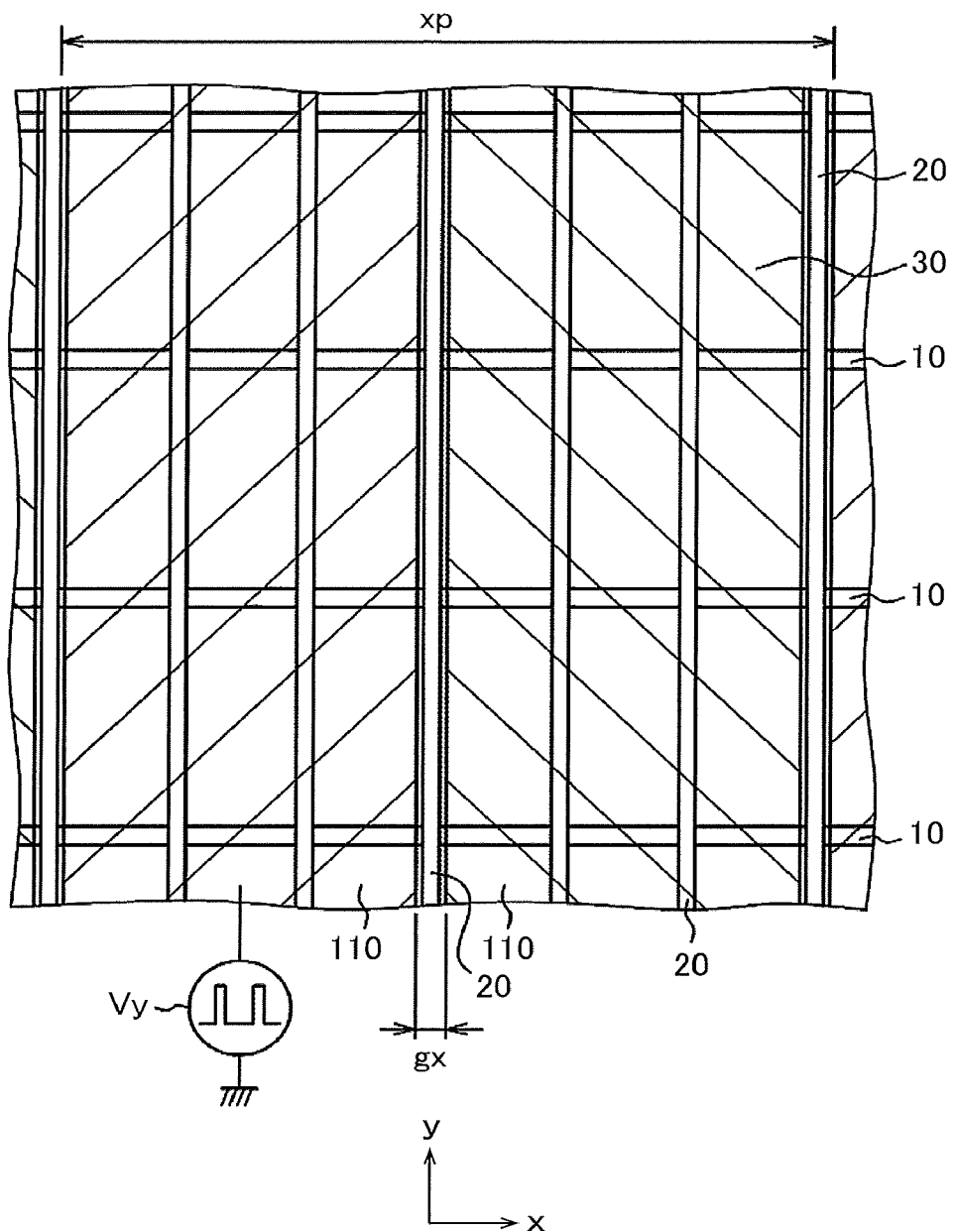
FIG. 5 is an enlarged plan view of the TFT substrate with the second electrode for the touch panel.

FIG. 5 is an enlarged plan view that shows the structure of the second electrode Tx in FIG. 4. In FIG. 5, the scan lines 10 extend in the lateral direction (x direction) and arranged in the longitudinal direction (y direction); the video signal lines 20 extend in the longitudinal direction (y direction) and are arranged in the lateral direction (x direction). A pixel 30 is formed in an area surrounded by the scan lines 10 and the video signal lines 20. The pixel electrode, the through hole, the TFT, and so on in the pixel 30 are omitted in FIG. 5.

In IPS type, specifically in FFS (Fringe Field Switching) type liquid crystal display device, the common electrode 110 is formed in common in plural pixels continuously; in FIG. 5, the common electrode extends in the longitudinal direction in a stripe shape with a width of three pixels; there is a gap gx between the left side common electrode 110 and the right side common electrode 110; each of the common electrodes 110 are insulated to each other. The common voltage for display and the driving voltage Vy for touch panel are applied alternatively to the common electrode 110.

In FIG. 5, the width of each of the stripe that constitutes the common electrode 110 (the second electrode Tx) is three pixels; this width, however, can be changed according to necessary definition for the touch panel; in general, the width of each of the stripes is bigger than the width of three pixels.

Figure 6:
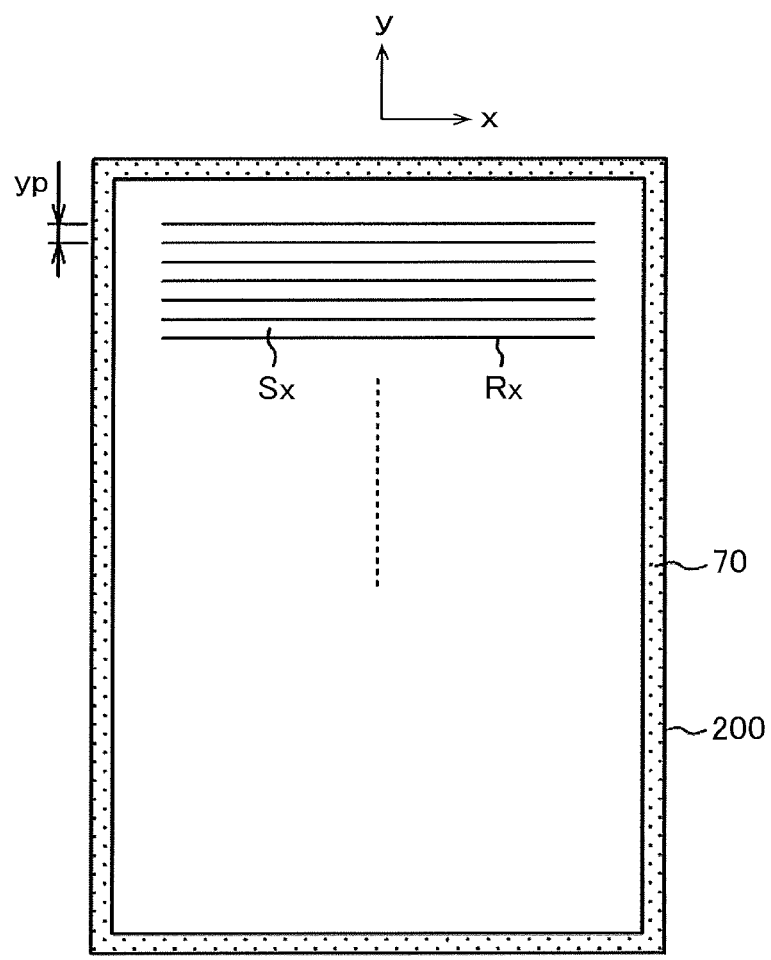
FIG. 6 is a plan view of the first electrode for the touch panel on the outside of the counter substrate.

FIG. 6 is a plan view of the counter substrate 200. The seal material 70 is formed at the periphery of the counter substrate 200 to adhere with the TFT substrate 100. On the surface of the counter substrate 200, the first electrodes Rx for the touch panel extend in the lateral direction (x direction) and arranged in the longitudinal direction (y direction) in a pitch yp. The electrode for the touch panel is not formed between the first electrodes Rx, thus, this area is a space area Sx. The space area Sx, however, is not an empty area, but dummy electrodes are formed in the space area Sx. The purpose of dummy electrodes is to attain more uniform distribution of electrodes or wirings to avoid streaks of reflection.

Figure 7:
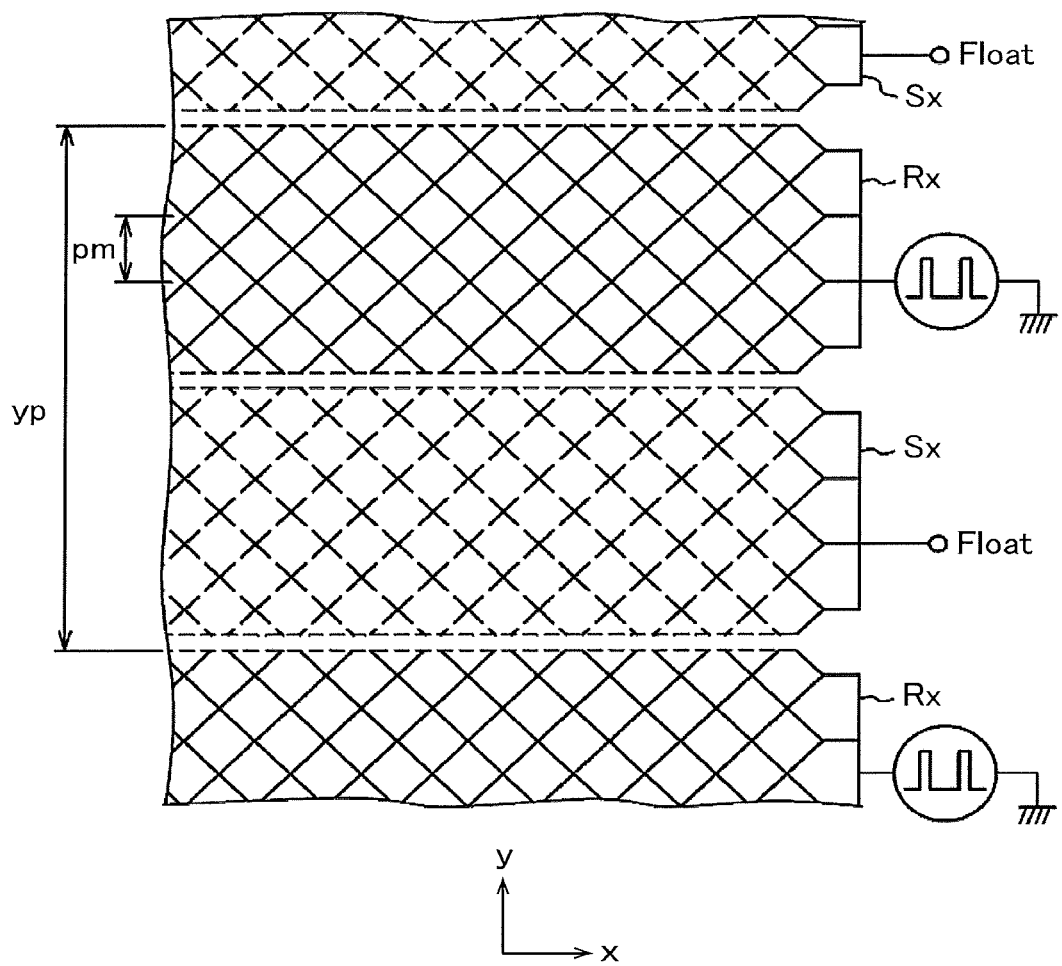
FIG. 7 is an enlarged plan view of the first electrode for the touch panel on the outside of the counter substrate.

FIG. 7 is a general structure of the first electrode Rx. As depicted in FIG. 7, the first electrode Rx is formed mesh like and extends in x direction. The first electrode Rx connects with the control circuit for the touch panel, which is not shown in FIG. 7; each of the first electrodes Rx are scanned sequentially to detect a change of the electro static capacitance to determine the touch position. In the meantime, a dummy electrode is formed in the space area Sx that is between the first electrodes Rx. The dummy electrode is in a float potential.

In FIG. 7, the pitch yp of the first electrodes Rx in the longitudinal direction is different from the pitch xp of the second electrode Tx in the lateral direction depicted in FIGS. 4 and 5; however, they can be made the same if necessary. In FIG. 7, the pitch pm of each of the meshes in the longitudinal direction is e.g. 170 μm. In FIG. 7, number of columns of the meshes in the longitudinal direction is four; however, the number can be increased according to necessity of the function of the touch panel. In FIG. 7, the width of the first electrode Rx and the width of the second wiring Sx in the slit are the same; however, they can be made different according to the function of the touch panel. Herein after, Sx designates the second wiring as well as the space area or the slit.

Figure 8:
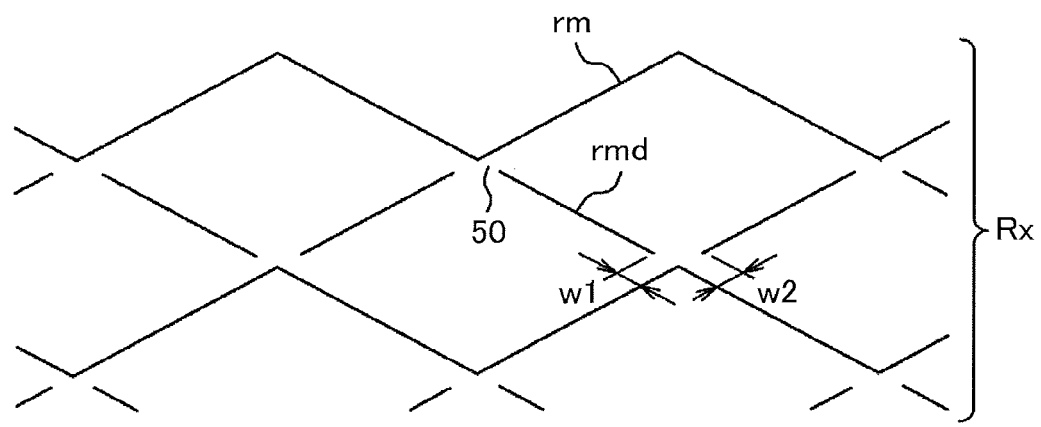
FIG. 8 is a detailed plan view of the first electrode according to the present invention.

FIG. 8 is a plan view that shows a detailed structure of the first electrode Rx. The feature of FIG. 8 is that first electrode Rx comprises zigzag shaped electrode wrings rm, which wirings extend in different directions are combined, and the dummy wirings rmd, each of which are set between the zigzag shaped wrings; wherein the pseud mesh wring structure is formed. In this case, a space 50 is formed between the bending portion of the electrode wiring rm and the dummy wring rmd. The width w1 or w2 of the space 50 are e.g. 5 μm.

Figure 9:
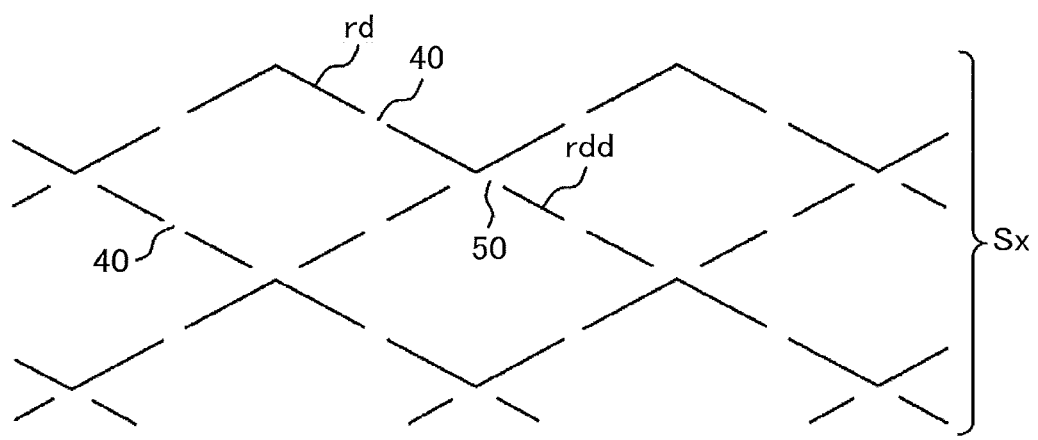
FIG. 9 is a detailed plan view of the dummy mesh electrode according to the present invention.

FIG. 9 is a plan view that shows detailed structure of the second wiring Sx. In FIG. 9, the dummy wiring rd is disposed at the position corresponding to the electrode wiring rm of the first electrode Rx. The dummy wiring rd differs from the electrode wiring rm in that the space 40 is set amid of the wiring, consequently, it does not work as an electric wring. The dummy wiring rdd is disposed at the position corresponding to the dummy electrode rmd of the first electrode Rx. The dummy wiring rdd, too, has the space 40 amid of the wring as the same as the dummy wiring rd. Further, the configuration that, the space 50 is set between the dummy wring rd and the dummy wiring rdd, is the same as in the case of the first wiring Rx.

Figure 10:
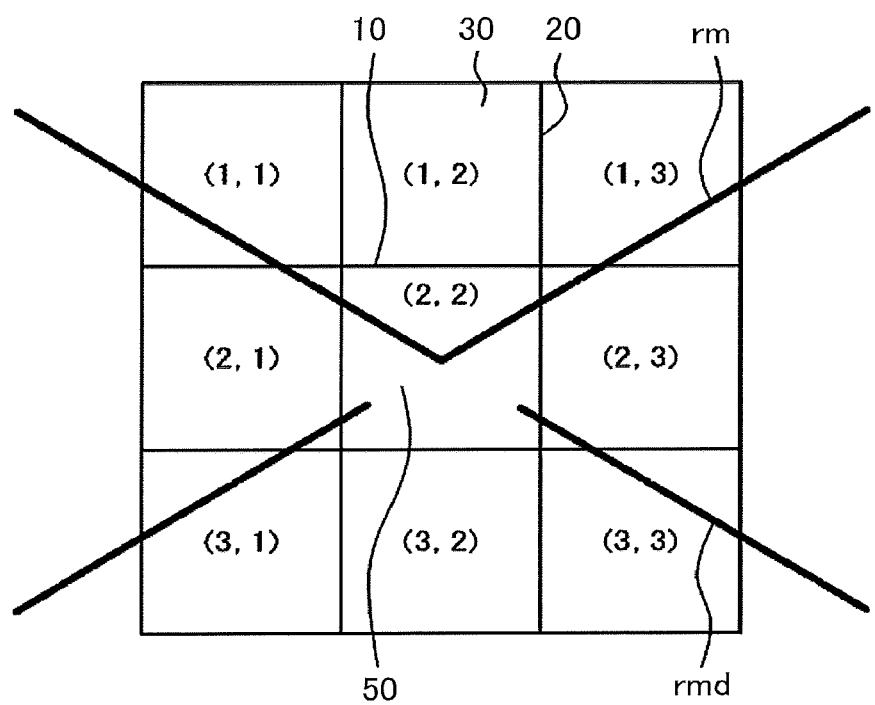
FIG. 10 is a transparent plan view that shows function of the present invention.
Figure 11:
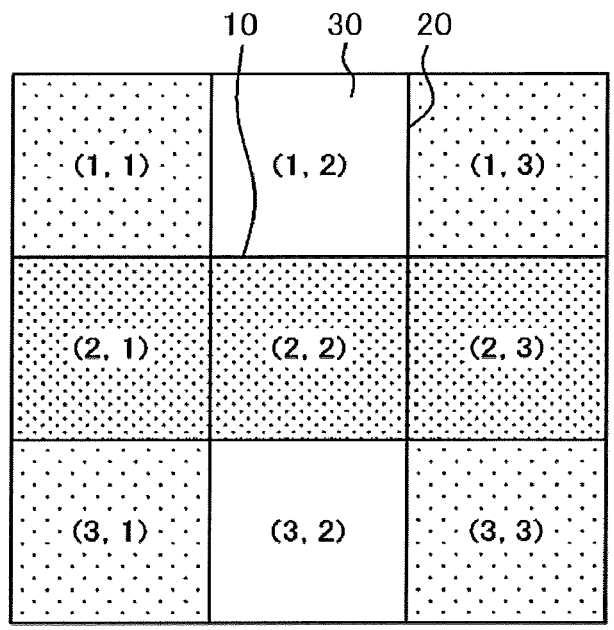
FIG. 11 is a plan view that shows the effect of the present invention.
Figure 14:
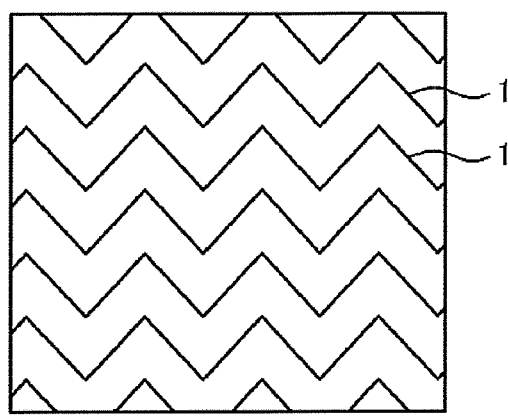
FIG. 14 is a plan view of an example of the Rx electrode wiring of zigzag shape.
Figure 14:
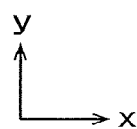
Figure 15A:
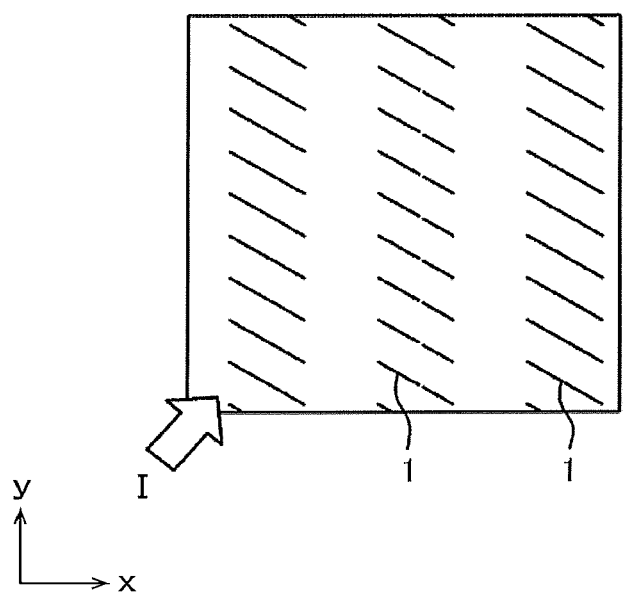
FIG. 15A is an example of reflected light when the Rx electrode wiring of FIG. 14 is illuminated from the lower left side of the screen.
Figure 15B:
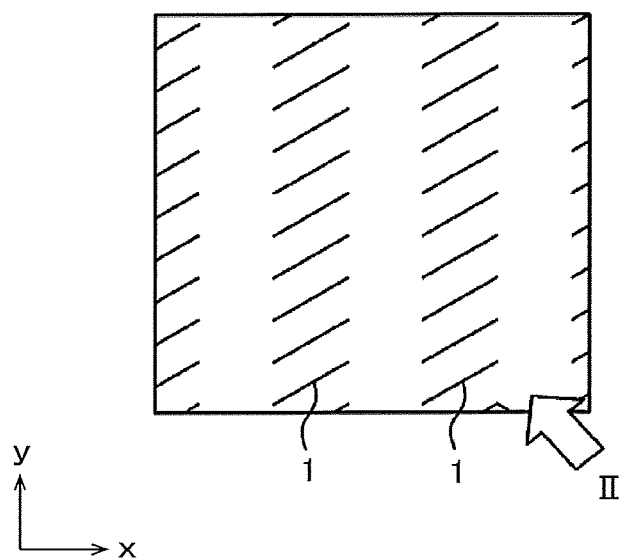
FIG. 15B is an example of reflected light when the Rx electrode wiring of FIG. 14 is illuminated from the lower right side of the screen.
Figure 16:
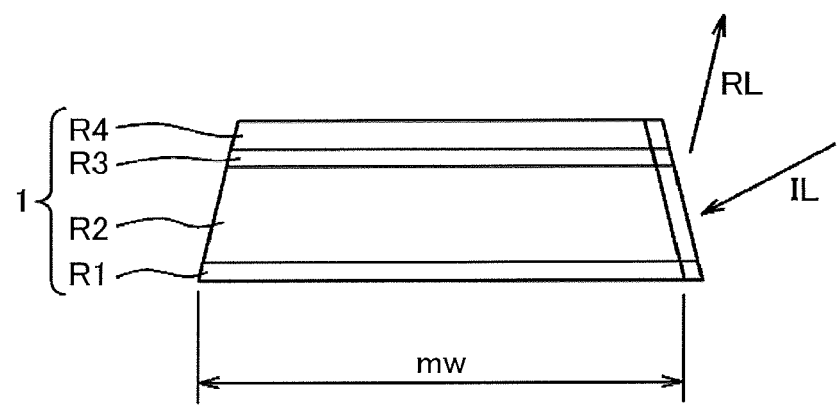
FIG. 16 is a cross sectional view of an example of the Rx electrode wiring.
Figure 17A:
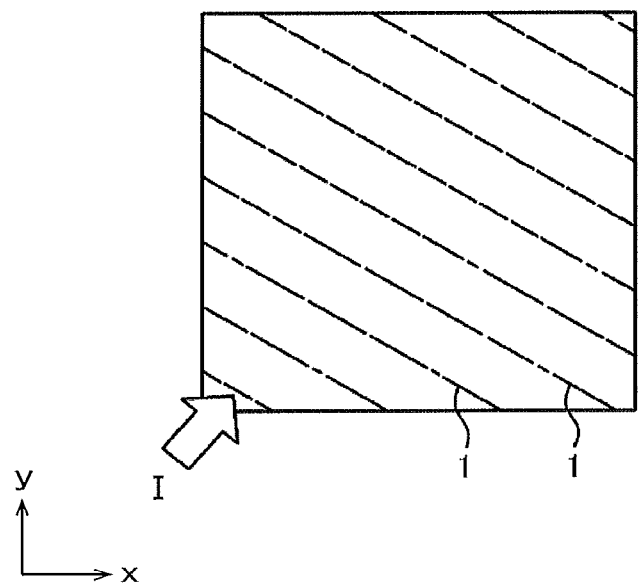
FIG. 17A is an example of reflected light when the Rx electrode wiring of mesh type is illuminated from the lower left side of the screen.
Figure 17B:
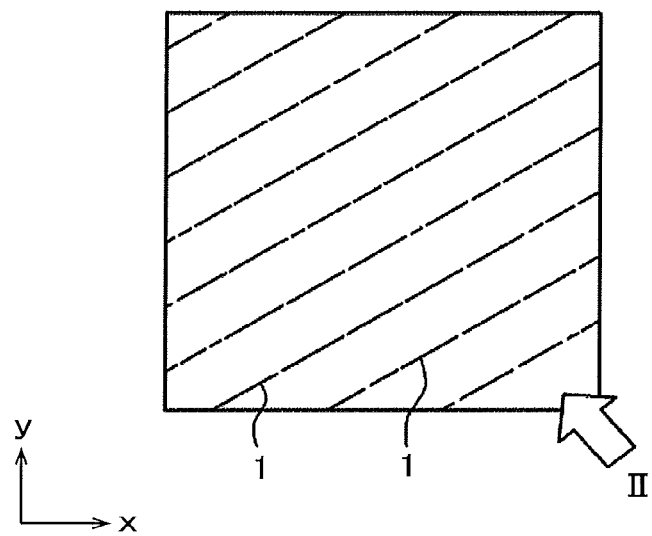
FIG. 17B is an example of reflected light when the Rx electrode wiring of mesh type is illuminated from the lower right side of the screen.
Figure 18:
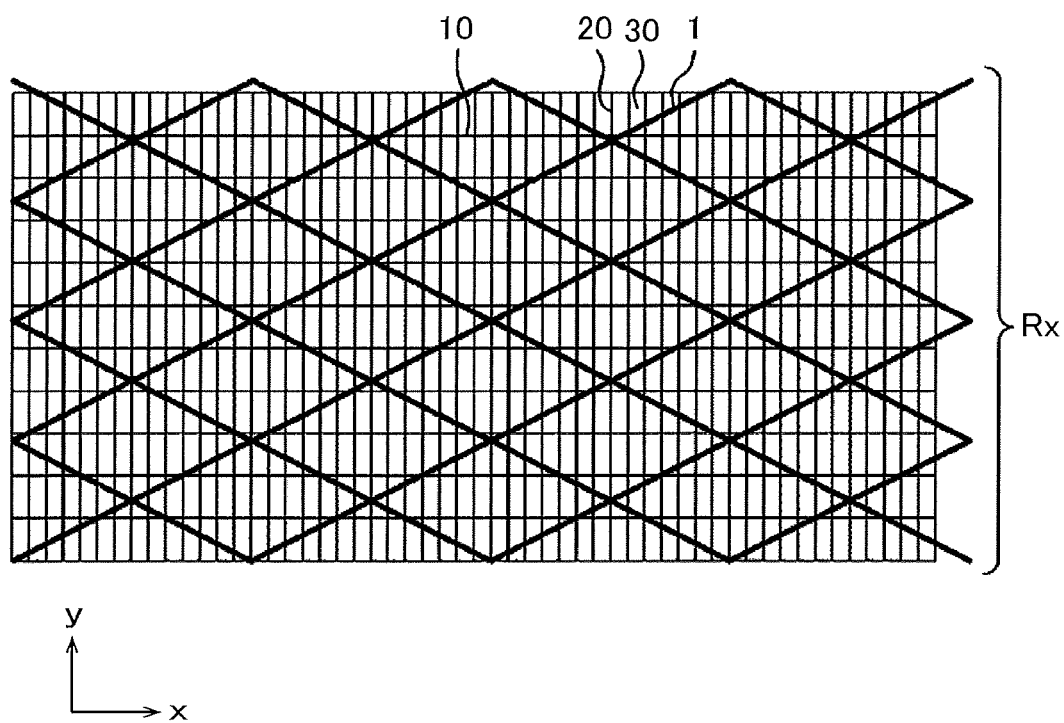
FIG. 18 is a plane view that the Rx electrode wiring of mesh type and the pixel area are superimposed.
Figure 19:
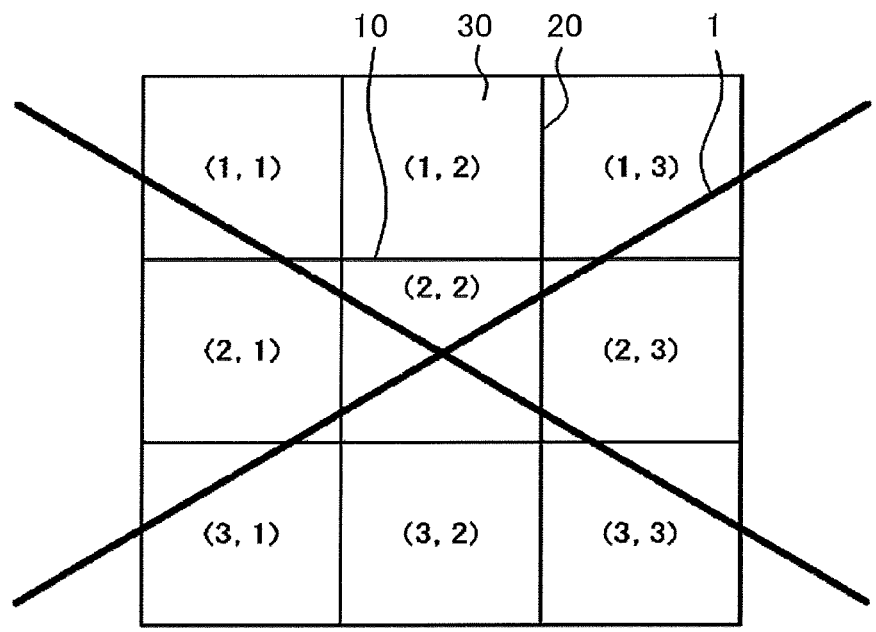
FIG. 19 is a plan view that explains the cause of moire.
Figure 20:
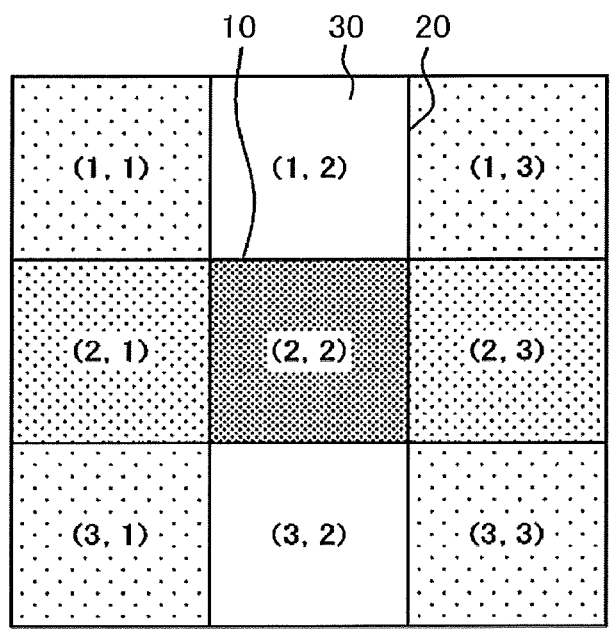
FIG. 20 is another plan view that explains the cause of moire.
Figure 21:
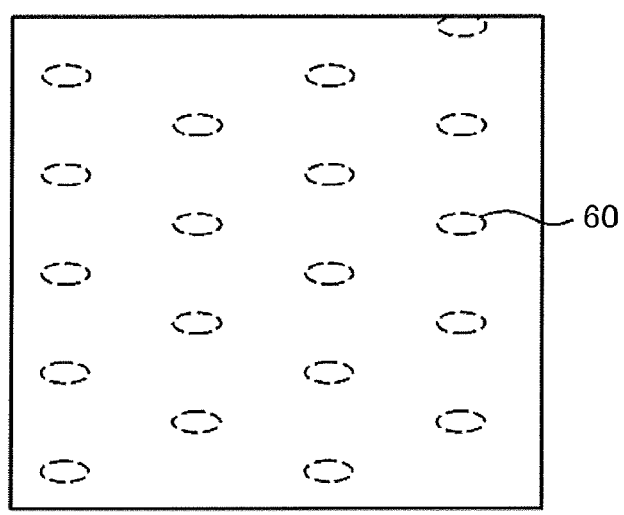
FIG. 21 is an example how moire is perceived.

FIG. 10 and FIG. 11 show the effect when the first electrode Rx of FIG. 8 is formed. In FIG. 10, which corresponds to FIG. 14, the pixels 30 and the electrode wiring rm as well as the dummy wiring rmd are superposed at the bending position and its vicinity of the electrode wiring rm. The numerals (n, m) represent the positions of the pixels in FIG. 10. At the center pixel (2, 2) in FIG. 10, the electrode wiring rm does not contact with the dummy wiring rmd, thus, a space 50 exists; consequently, light shield effect in pixel (2, 2) decreases. In this structure of the embodiment 1, a number of wirings is decreased from 4 to two compared with when the wrings are in a normal mesh structure. In other words, the brightness in the center pixel (2, 2) is increased by forming the spaces 50 compared with a normal wiring of mesh structure depicted in FIG. 19.

FIG. 11 is a plan view that shows brightness of each of the pixels according to the effect of the above structure. In this embodiment shown in FIG. 11, the brightness of the center pixel (2, 2), which was the least brightness in FIG. 19, becomes as bright as the pixels (2, 1) and (2, 3), which are at the sides of the center pixel (2, 2). Namely, a decrease in brightness in the pixel 30, caused by superposing with the bending position of the electrode wiring rm, can be suppressed; consequently, the difference in brightness between adjacent pixels 30 is decreased, thus generation of moire is suppressed when considered as a whole screen.

Further, problem of streaks of reflection in the longitudinal direction is eliminated since the invisible areas in the longitudinal direction according to the inspection direction are eliminate because the structure of the electrode is mesh shaped, even it is pseudo mesh.

Embodiment 2

Figure 12:
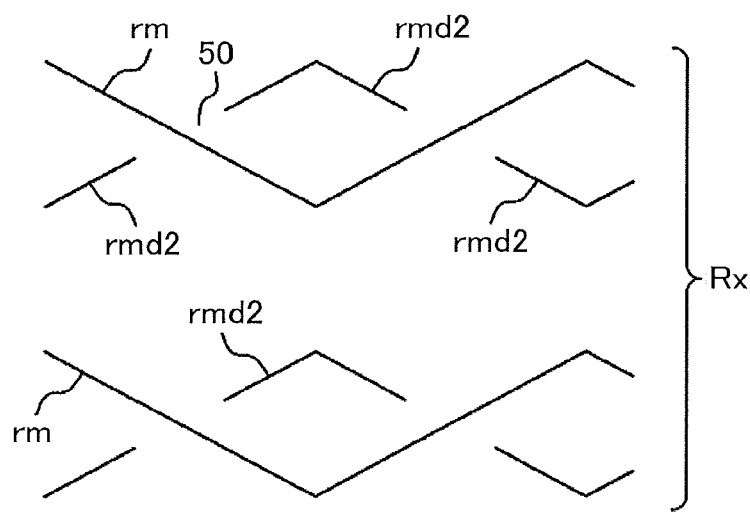
FIG. 12 is a plan view of the first electrode of the embodiment 2 according to the present invention.

FIG. 12 is a plan view of the structure of the first electrode Rx according to the embodiment 2. In this embodiment, the structure of the electrode wiring rm is the same as the one in the embodiment 1; however, the structure of dummy wiring rmd2 is different from the embodiment 1. As depicted in FIG. 12, the dummy wring rmd2 has a bending point having the same angle as the electrode wiring rm in the middle; the bending point is located at a symmetric position to the bending point of the electrode wiring rm. When viewed from whole electrode wiring rm, the dummy wrings rmd2 are paired with the electrode wirings rm so that they have pseudo symmetrical configuration. In the meantime, there is a space 50 between the electrode wiring rm and the dummy wiring rmd2 so that they don't directly contact. The space 50 is e.g. 5 μm.

In such an arrangement, when viewed from whole screen, the first electrode Rx has a pseudo mesh structure as in the case of the embodiment 1. In the example of the embodiment 2, too, the dummy electrode rmd is set with spaces at the bending point of the electrode wiring rm; consequently a decrease in brightness of the pixel can be suppressed at this point as in the case of the embodiment 1.

Figure 13:
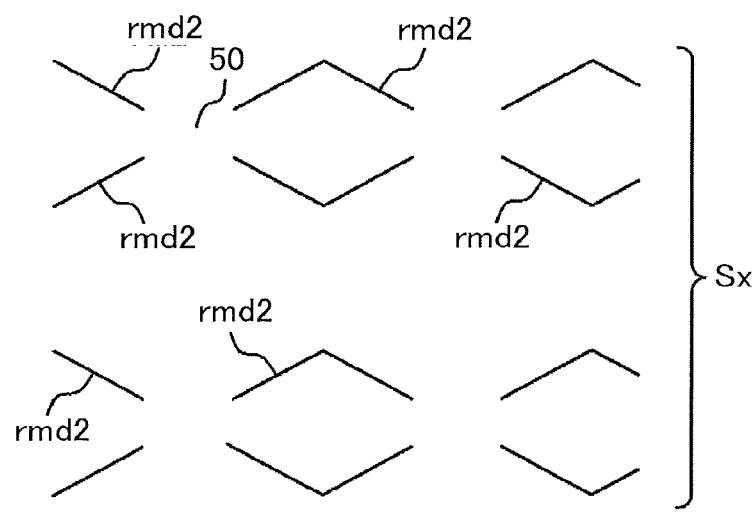
FIG. 13 is a plan view of the second electrode of the embodiment 2 according to the present invention.

FIG. 13 is a plan view that shows the structure of the second wiring Sx. In the case of the second wiring Sx, there is no electrode wiring rm; and all wirings are formed by assembly of the dummy electrodes rmd2, consequently, the second wiring Sx constitute a pseudo mesh structure as a whole.

As described above, the embodiment 2, too, has the same effect as in the embodiment 1.

In above explanation, the first electrode Rx, which is a detecting electrode of the touch panel, extends in x direction; however, the present invention is applicable to the structure where the first electrode Rx extends in y direction.

Further, in the above explanation, the liquid crystal display device was taken as an example; however, the present invention is applicable to other displays as e.g. an organic EL display.

What is claimed is:

1. A display device having metal wirings for a touch panel on a display screen comprising:
the metal wirings include,
first metal wirings extending in a first direction and arranged in a second direction in parallel,
second metal wirings arranged between the first metal wirings,
each of the first metal wirings has a first line, which is configured to have a first angle to the first direction, and a second line, which is configured to have a second angle to the first direction,
each of the second metal wirings has a third line, which is configured to have the first angle to the first direction, and a fourth line, which is configured to have the second angle to the first direction,
the first metal wiring and the second metal wiring are arranged so that the first line, the second line, the third line and the fourth line form a rectangle,
wherein, at a cross point of the first line, the second line, the third line and the fourth line, the first line and the second line are connected and the third line and the fourth line are separated from the first line and the second line,
wherein the metal wirings further include,
third metal wirings extending in a first direction and arranged in a second direction in parallel,
fourth metal wirings arranged between the third metal wirings,
the third metal wiring and the fourth metal wiring are set between the first metal wiring and the second metal wiring,
each of the third metal wirings has a fifth line, which is configured to have the first angle to the first direction, and a sixth line, which is configured to have the second angle to the first direction,
each of the fourth metal wirings has a seventh line, which is configured to have the first angle to the first direction, and an eighth line, which is configured to have the second angle to the first direction,
the third metal wiring and the fourth metal wiring are arranged so that the fifth line, the sixth line, the seventh line and the eighth line form a rectangle, and
wherein, at a cross point of the fifth line, the sixth line, the seventh line and the eighth line, the fifth line and the sixth line are connected and the seventh line and the eighth line are separated from the fifth line and the sixth line.

2. The display device according to claim 1,
wherein an area surrounded by the first metal wirings and the second metal wirings is parallelogram.

3. The display device according to claim 1,
wherein the first line and the fourth line are parallel and the second line and the third line are parallel.

4. The display device according to claim 1,
wherein the first metal wirings are used as detecting electrodes for the touch panel, and the second metal wirings are dummy electrodes.

5. The display device according to claim 1,
wherein the third metal wrings and the fourth metal wirings are dummy electrodes for the touch panel,
an opening is formed in a straight line portion of the fifth line, sixth line, seventh line and the eighth line.

* * * * *